Figure 1:
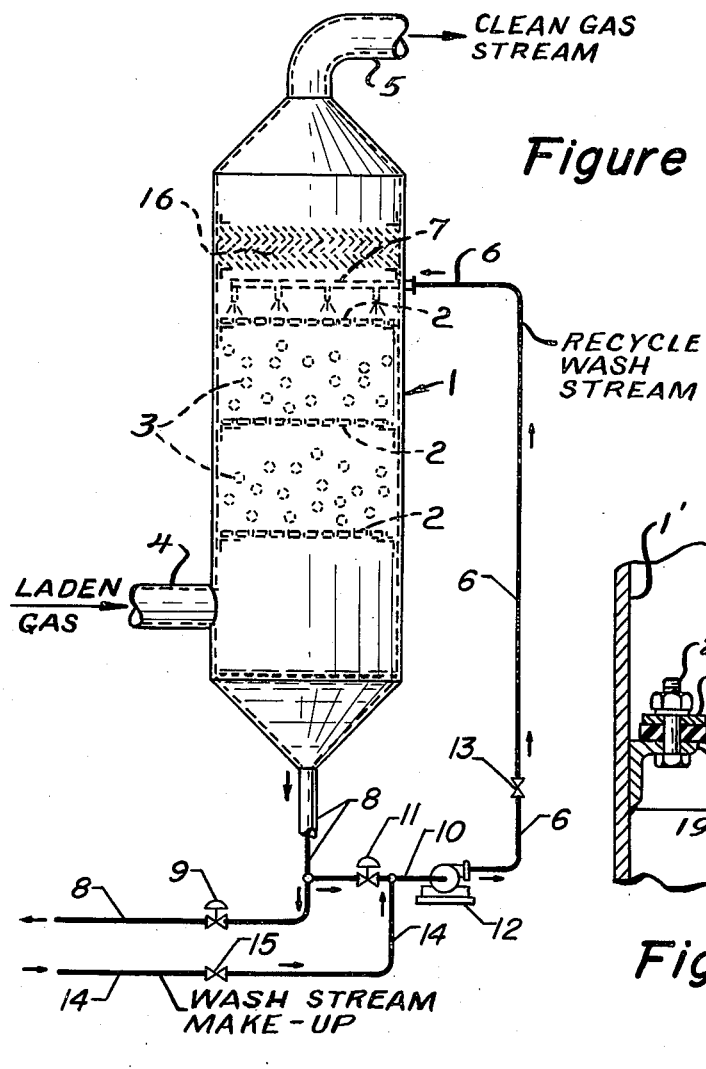

United States Patent [19]

Sarmiento et al.

[11] 3,996,317
[45] Dec. 7, 1976

[54] GAS-LIQUID SCRUBBER WITH RESILIENT FLEXIBLE GRIDS

[75] Inventors: Otto M. Sarmiento, Darien, Conn.; Peter Ekholm, Mahwah, N.J.

[73] Assignee: Universal Oil Products Company, Des Plaines, Ill.

[22] Filed: Nov. 4, 1974

[21] Appl. No.: 520,819

[52] U.S. Cl. .................................. 261/97; 55/91; 55/233; 55/293; 55/513; 261/113
[51] Int. Cl.² .......................................... B01F 3/04
[58] Field of Search .............................. 261/94–98, 261/113, 81, 114 TC, 2, 3, 6, 121 R, DIG. 72; 55/94, 91, 290, 484, 505, 293, 494, 513, 233; 52/660, 664, 667

[56] References Cited

UNITED STATES PATENTS

| | | | |
|---|---|---|---|
| 1,499,864 | 7/1924 | Gordon | 55/484 |
| 1,873,843 | 8/1932 | MacDonald | 261/121 R |
| 3,033,193 | 5/1962 | Rathman | 261/94 X |
| 3,122,594 | 2/1964 | Kielback | 261/94 |
| 3,156,957 | 11/1964 | Moeckel | 52/667 |
| 3,171,820 | 3/1965 | Volz | 261/94 X |
| 3,218,048 | 11/1965 | Smith, Jr. et al. | 261/94 |
| 3,307,317 | 3/1967 | Lynn | 52/667 |
| 3,325,155 | 6/1967 | Bahout | 261/113 |
| 3,350,075 | 10/1967 | Douglas | 261/95 |
| 3,410,057 | 11/1968 | Lerner | 261/94 X |
| 3,855,368 | 12/1974 | Prochazka et al. | 261/81 |

OTHER PUBLICATIONS

Hawley, G. G., *The Condensed Chemical Dictionary*, Eighth Edition, Copyright, 1971, New York, pp. 712, 713, 766–768.

*Primary Examiner*—Tim R. Miles
*Assistant Examiner*—Richard L. Chiesa
*Attorney, Agent, or Firm*—James R. Hoatson, Jr.; Philip T. Liggett; William H. Page, II

[57] ABSTRACT

An improved gas-liquid scrubber utilizing resilient and flexible perforated transverse grid members has the ability to flex and fracture off any excessive solids buildup that may occur in certain scrubbing operations. For example, high tensile strength, thick rubber screen material can be utilized. Also, certain thermoplastic olefin rubber materials or the styrene-butadiene-based thermoplastic elastomers may be suitable flexible grid materials.

7 Claims, 4 Drawing Figures

GAS-LIQUID SCRUBBER WITH RESILIENT FLEXIBLE GRIDS

The present invention relates to an improved scrubber chamber for accommodating the countercurrent contacting of a gaseous stream with a liquid medium to remove an undesired gaseous or vapor component and/or entrained materials in the gaseous stream.

More particularly, the invention is directed to providing resilient and flexible perforated grid means across a gas stream scrubbing chamber such that the grids can flex and fracture off any excessive solids buildup.

There are, of course, many types of gas-liquid contacting operations and varying types of countercurrent contacting chambers that are employed in connection with various petroleum and chemical plant processing systems, as well as employed in scrubbing fume and particle laden streams from power plants and general industrial manufacturing operations. For example, a plurality of spaced perforated plates are frequently used in a chamber to provide a "sieve deck" type of gas-liquid scrubbing tower. Also, in an improved type of scrubbing chamber, there has been the use of light weight, spherically shaped mobile elements in one or more spaced beds between perforate retaining grids to provide for improved particle removal and gas scrubbing operations. Such scrubbers or contactors have been generally referred to in the industry as "floating bed scrubbers". A U.S. Pat. No. 3,122,594, issued to A. W. Kielback, teaches the utilization of the light weight elements in one or more vertically spaced zones of a contact chamber where the upward gas flow causes the entire bed of elements to float and be lifted in a loose arrangement against an upper perforate barrier where they will move and rotate from the stream flows. In U.S. Pat. No. 3,350,075, issued to H. R. Douglas, there is disclosed a contacting operation where the light weight floating elements can have a more turbulent, random movement between more widely spaced perforate barrier means, as compared to the more compact bed of Kielback.

In certain scrubber operations handling entrained fumes and particles as well as utilizing certain types of liquid or slurry wash streams, there can be a problem of a solids material buildup on the transverse, stream distributing grids in the scrubber tower. For instance, where stack gases containing sulfur dioxide ($SO_2$) and some fly ash are washed with a limestone and/or lime-containing slurry stream to effect the removal of the $SO_2$, there can be a resulting gypsum-like solids buildup on the grids of the contacting chamber. Specifically, there can be layers of calcium sulfate and calcium sulfite, as well as calcium carbonate and some dolomite, $CaMg(CO_3)_2$, which may be supplied with the limestone in the slurry wash stream. Reported X-ray diffraction and microscopic examinations of scale formations on scrubber surfaces, that were alternately wet and dry during the scrubbing of stack gases with a slurry of limestone, but containing some dolomite, showed calcium sulfite, calcium sulfate as relatively large gypsum crystals and fly ash. Some of the fly ash particles also seemed to have a complex coating that included iron, aluminum, silicon and sulfur, that may have been formed by a reaction between the fly ash and the wash solution.

Thus, to preclude a scale or solids buildup on the perforate plate or grid system of a scrubber and prevent the blinding of the holes through the grids, it is a principal object of this invention to provide for a flexible construction in the grid means such that buildup of scale or a stratification of solids will be subject to fracture and removal.

It may also be considered an object of this invention to provide a grid construction which uses two or more sections of flexible, rubber-like material adapted to retain mobile, light weight elements therebetween such that upward gas flow and/or downward liquid wash stream flow can cause sufficient flexure to the grid surfaces to, in turn, break off a major portion of any solids accumulations, as well as reduce wear on the elements, in comparison to metal grids.

In a broad aspect, the present invention provides in a gas-liquid scrubber tower, where a descending liquid stream contacts a laden gas stream and solids layers can deposit on transverse perforated grids in the chamber, the improvement which comprises, providing flexible and resilient flow distributing grid means across the interior flow path of said chamber so that such grid means has the ability to flex and fracture off any excessive solids buildup.

In another embodiment, the improved scrubber provides for two or more vertically spaced perforate grid means which are of a flexible and resilient material, with such spaced grid means being adapted to retain light weight, mobile elements which will be present for the countercurrent flows of the gaseous stream and the washing stream to, in turn, provide greater surface area and a more efficient scrubbing operation.

In connection with the latter embodiment, it should be noted that the flexible and resilient grid members can be of advantage in causing less wear and breakage of mobile elements as compared to the hard and sharp edges of metal grid members. One of the operational problems of the floating bed type of scrubbers which typically use hollow polyolefin spheres and the like, as the light weight mobile elements, is the rapid wear and breakage of such spheres. There has been considerable research in connection with the spheres themselves in order to provide better sphere construction or find materials which will have greater wear characteristics; however, there can also be a lessening of wear through the use of the rubber-like, resilient surfaces provided by the improved grids of the present invention.

Various types of resilient materials may be utilized in providing improved grids for a scrubber chamber and it is not intended to limit the scope of the present invention to the use of any one particular material. Preferably, rubber or other rubber-like materials will have suitable flexibility and resiliency to effect the desired fracture of solids buildup and preclude thick stratified layers from blocking or "blinding" the openings of scrubber grid members. In addition, the material should have high tensile strength, abrasion resistance, heat resistance, and in certain instances, chemical resistance to either acidic or alkaline materials. For example in stack gas scrubbing, the various $SO_2$ absorbing fluids, such as slurries of calcium carbonate, lime, dolomite, etc., as well as the resulting reaction products, including, calcium sulfate, calcium sulfite, etc., need be resisted by the grid material. For low temperature operations, natural rubber can be utilized, as well as the various synthetic rubbers including neoprene, butyl rubber, styrene-butadiene rubber, etc.; however, for higher temperature operations, the heat resistant synthetic rubbers are preferred. Other synthetic resilient and flexible materials may include polyurethane and the new thermoplastic elastomers such as the "thermoplastic olefin rubber" materials (Uniroyal's TPR materials are an example), or a styrene-butadiene-based thermoplastic elastomer (such as Kraton manufactured by Shell Chemical Company). Still another material may comprise a polyester elastomer, such as Hytrel distributed by E. I. duPont de Nemours and Company.

In small chambers, whether vertically oriented or horizontally oriented for the gas flow, the rubber-like grid members may be of a single piece supported around the peripheral inside wall portions of the chamber; however, where there are relatively large diameters or large rectangular internal areas for the particular scrubbing chamber then smaller sections of resilient grid materials will be supported between intermediate support members and a plurality of sections will make up the surface area of one grid member. The thickness of a particular grid section will depend upon the tensile characteristics of the particular rubber-like material being supplied and to some extent upon the percentage of open area in any one grid member. It is, of course, desired that each grid section will be sufficiently thin and flexible as to permit flexure and the fracturing of any layers of solids buildup. In connection with scrubbing chambers utilizing light weight mobile spheres or other contact elements, it will, of course, be necessary that grid openings be sized and spaced to preclude the passage of the mobile element through the grid. The openings or perforations in the grid may be circular, rectangular, oval, or whatever, as long as there is a proper proportion of open area through a grid to accommodate the volume of gas-liquid countercurrent flows.

Reference to the accompanying drawing and the following description thereof will serve to illustrate how a flexible grid member can be of advantage in precluding solids buildup in countercurrent flow scrubbing towers.

FIG. 1 of the drawing is a diagrammatic elevational view indicating a typical countercurrent gas scrubbing operation in a vertically oriented chamber where the scrubbing is effected in the presence of mobile elements between transverse grid members.

Figure 2:
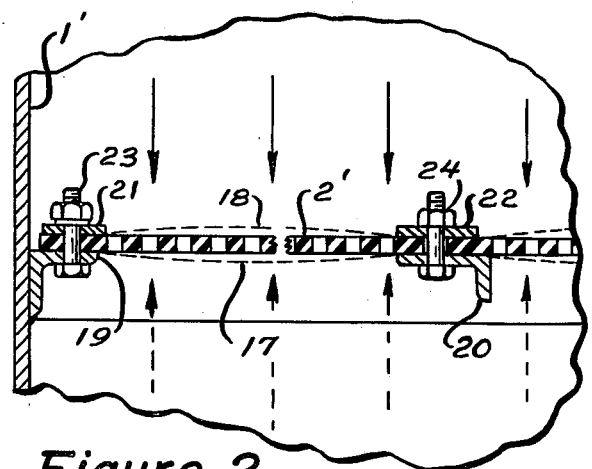

FIG. 2 of the drawing indicates in a partial sectional elevational view how a particular perforate grid member of resilient material can flex both upwardly and downwardly during the countercurrent flow operations.

Figure 3:
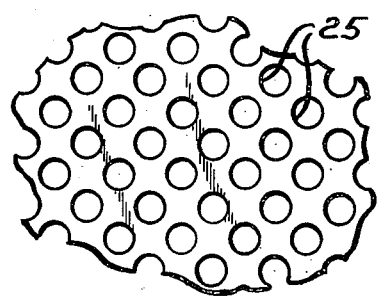
Figure 4:
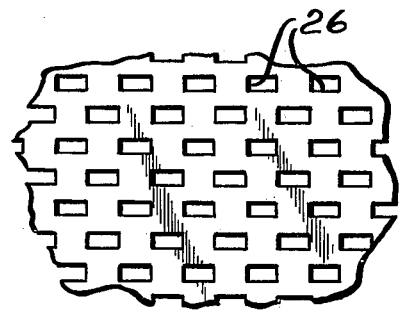

FIGS. 3 and 4 of the drawing merely indicate in a diagrammatic manner that the grid openings may be of various configurations.

Referring now particularly to FIG. 1 of the drawing, there is indicated a vertically oriented scrubber chamber 1 with spaced perforate grid members 2 adapted to retain movable light weight contact members 3 which will assist in providing additional surface area for the countercurrent flow of the particle and/or fume laden gaseous stream and a descending liquid scrubbing stream. As shown in the drawing, the grid members 2 have an open area defined by their perforations which limit the flow rate of the liquid scrubbing stream through the grids 2 and cause the stream to be distributed relatively uniformly across the flow path of the chamber. The laden gas stream is indicated as entering at inlet means 4 and being discharged at an upper outlet means 5 while a scrubbing stream is introduced from inlet line 6 and spray distributing means 7. The used washing liquid or slurry is collected within the lower portion of the scrubber tower 1 and permitted to be discharged by way of line 8. A controlled portion may be discharged through valve 9 while another portion may be recycled by way of line 10 with valve means 11 to recycle pump 12, which in turn discharges into line 6 with control valve 13 such that there is a recycle feed to the distributing nozzles at 7. Additional wash stream make-up may be supplied to line 10, ahead of pump 12, through line 14 with control valve 15.

As heretofore noted, in countercurrent scrubbing towers of this type, or of a sieve-deck type where there are no mobile elements, there can be a solids buildup on the grid members 2 depending upon the nature of the laden gas stream and the type of wash stream being utilized for the particular scrubbing operation such that there is a need for a flexible type of grid to preclude the blinding or blockage of perforations in each of the grid members. There is also a need to preclude solids buildup on mist extracting means such as indicated at 16 within the upper portion of chamber 1.

In accordance with the present invention and as better illustrated by reference to FIG. 2 of the drawing, there is indicated a sectional view of grid members 2' within the interior of a chamber 1' which will have the ability to flex and move both upwardly and downwardly to the dotted-line positions indicated at 17 and 18. Preferably, the degree of movement shall be sufficient to insure the fracturing and removal of any and all solids materials that tend to build up on the grid members. The sloughed-off solids will be washed to the lower portion of the contact chamber and be removed from the system or, in part, recirculated.

The grid section 2' is indicated in FIG. 2 as being clamped between peripheral and intermediate support members such as 19 and 20 by suitable hold-down bars 21 and 22 as well as by spaced bolt means at 23 and 24. In a small chamber, as heretofore noted, the grid member 2' may extend entirely across the chamber and be suitably held by peripheral grid support means. On the other hand, in a large diameter or wide rectangular form chamber, there will necessarily be one or more intermediate support members such as 20, and a plurality of grid sections, such as 2'. From the structural aspects, the spacing of the support members 20 and the thickness of the grid sections 2' will be correlated such that the latter will provide adequate flexure to insure the fracturing and breaking away of solids material. The upward and downward pressures on a transverse grid system will, of course, be exerted from the upwardly flowing gas stream and from the downwardly flowing wash stream. Under steady state operation, a flexure will tend to be either upwardly or downwardly for any one grid section; however, typical operations provide non-steady state conditions and there will be some upward pressure surges as well as downward pressure surges to provide the desired upward and downward flexure of the flexible grid sections.

The rubber-like grid members will also have greater resiliency and abrasion resistance such that each section can have a long wear life as well as permit greater life to any mobile elements which may be retained between spaced grids of the chamber. As heretofore noted, it has been a problem in the floating bed type of scrubbers to provide a long wear life to the light weight hollow spherical elements by reason of their contacting each other and contacting retaining grid members. In connection with the present invention utilizing the resilient, rubber-like grids, there will be less sharp edges or corners at each of the multiplicity of perforations to cause breakage and rapid wear of the mobile elements.

It is, of course, not intended to limit the grid means of the present invention to any one pattern or to the use of any one type of perforation in effecting the open area of a grid. In FIG. 3 of the drawing, there is indicated a portion of a grid section utilizing a multiplicity of round openings 25; however, as best illustrated in FIG. 4 of the drawing, there may be rectangular-form openings such as 26, to make up the desired open area of a particular grid. Still other configurations may be utilized in forming grid openings, including ovals, squares, long slots and the like. Typically, in a conventional countercurrent scrubber, there will be the order of 30 to 70% or more of any one grid that has free or open area to accommodate the countercurrently flowing streams through the chamber.

Although the present drawing has indicated that a contact chamber will be in a vertical orientation, it is to be noted that a sieve-deck chamber may extend horizontally in order to accommodate a laterally flowing gaseous stream and that a wash liquid may be supplied downwardly through the laterally moving gaseous stream. In other words, it is not intended to limit the present invention to the use of transverse grid means in only a vertically oriented tower or chamber.

We claim as our invention:

1. In a gas-liquid scrubber chamber having a plurality of transverse flow distributing grid means therein which contain perforations which limit the flow rate of a descending liquid stream and distribute said stream so as to contact a rising gas stream laden with solids which can deposit on the transverse perforated grids in the chamber, the improvement which comprises, providing that each transverse flow distributing grid means is perforated to have a majority of its transverse area be open area and have a majority of the remaining non-open transverse area comprise flexible, resilient deformable elastomeric material that flexes during operation to fracture or break off particles of solids buildup on said material.

2. The scrubber chamber of claim 1 further characterized in that said plurality of flow distributing, flexible and resilient grid means are positioned at spaced apart vertical distances to traverse the interior of said chamber and serve to provide unobstructed contact zones for floating and randomly movable contact elements therebetween.

3. The scrubber chamber of claim 1 further characterized in that said flexible and resilient grid means are of a heat resistant rubber.

4. The scrubber chamber of claim 1 further characterized in that said flexible and resilient grid means are of a polyurethane material.

5. The scrubber chamber of claim 1 further characterized in that said flexible and resilient grid means are of a thermoplastic olefin rubber-like material.

6. The scrubber chamber of claim 1 further characterized in that said flexible and resilient grid means are of a styrene-butadiene-based thermoplastic elastomer.

7. The scrubber chamber of claim 1 further characterized in that said flexible and resilient grid means are of a polyester elastomer.

* * * * *